July 2, 1957     C. S. LISOWSKI     2,797,483
DENTAL ARTICULATOR
Filed April 6, 1956
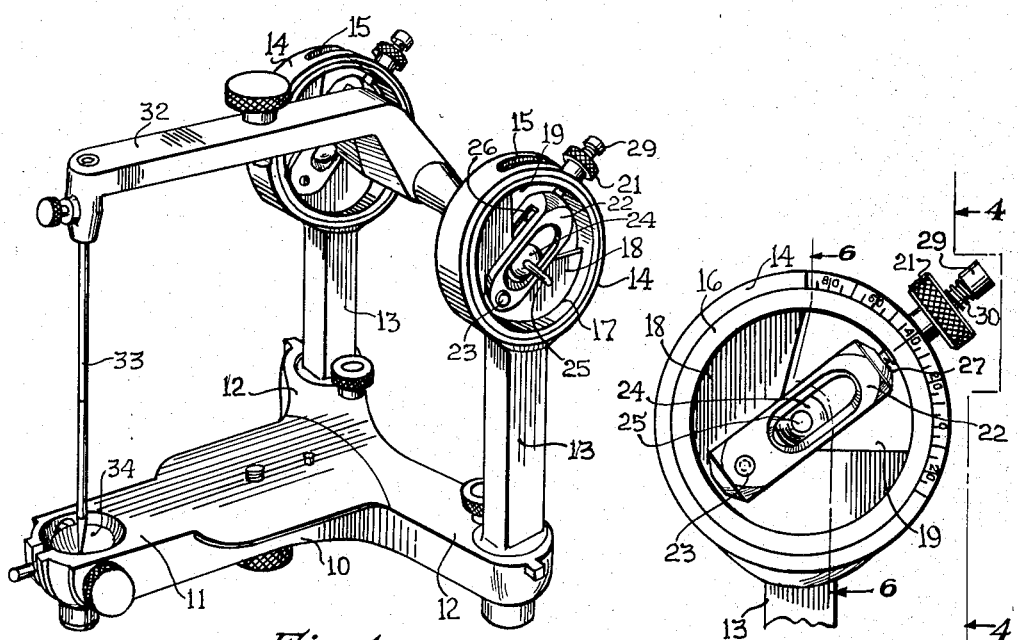
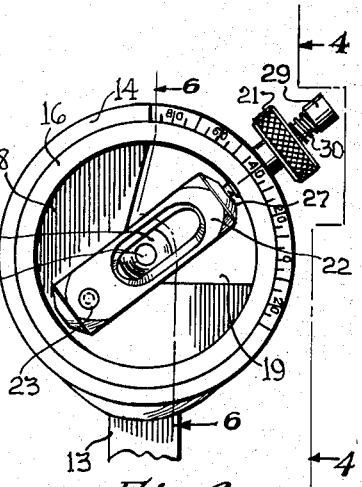
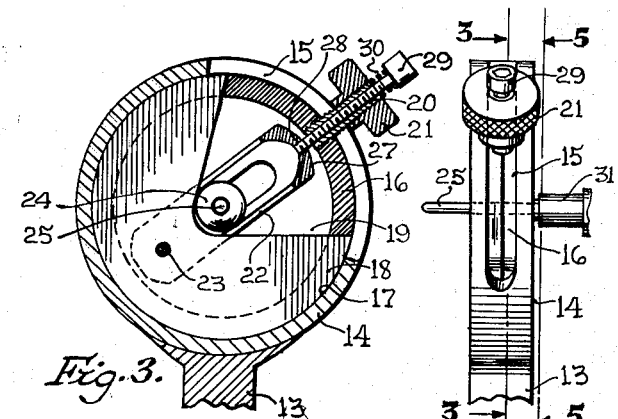
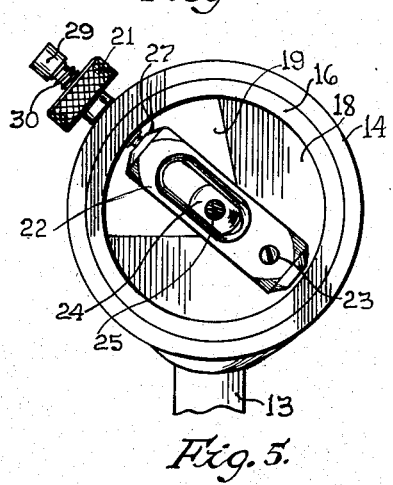
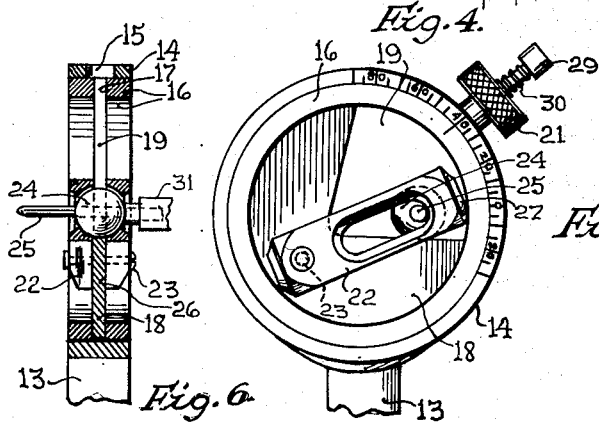
INVENTOR.
CASIMER S. LISOWSKI
BY
HIS ATTORNEYS.

United States Patent Office 2,797,483
Patented July 2, 1957

2,797,483

DENTAL ARTICULATOR

Casimer S. Lisowski, Chicago, Ill.

Application April 6, 1956, Serial No. 576,709

5 Claims. (Cl. 32—32)

My invention relates to new and useful improvements in dental articulators and has for its principal object the provision in a device of this character by which the movements of the human mandible are reproduced.

Another object of my invention is the provision in a device of this character whereby movements and measurements of artificial teeth may be observed as a help in providing proper tooth alignment and arch formations.

A further object of my invention is the provision in a device of this character whereby a study may be made of the occlusion of the natural dentition by means of models, and proper procedure instituted to achieve occlusal equilibration.

A still further object of my invention is the provision in a device of this character whereby the occlusion of artificial dentures may be fully equilibrated, also known as balancing, to a heretofore unknown degree.

Yet another and equally important object of my invention is the provision of a device of this character which results in more accurate and varied adjustment of the articulator so as to enable the movements of the human mandible to be reproduced with the utmost accuracy.

Still another object of my invention is to provide a device of this character whereby the spherical condylar heads permit a universal movement of the upper denture-holding member.

An equally important object of my invention is to provide in a device of this character a spherical condylar head which permits the condylar sphere carried thereby to have free movement with respect to the adjustable disc element of the condylar head.

A further object of my invention is the provision of a latching means in a device of this character, which latching means is carried by the condylar heads and is operable on the adjustable discs and condylar spheres carried thereby.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a dental arctictular embodying my improved condylar heads;

Fig. 2 is a fragmentary side elevational view of one of my improved condylar heads;

Fig. 3 is a sectional detail view taken on line 3—3 of Fig. 4;

Fig. 4 is a rear elevational view taken on line 4—4 of Fig. 2;

Fig. 5 is a fragmentary side elevational view taken on line 5—5 of Fig. 4;

Fig. 6 is a detail sectional view taken on line 6—6 of Fig. 2; and

Fig. 7 is a fragmentary side elevational view of my improved condylar head shown in its unlatched position.

The dental articulator as depicted in Fig. 1 is of well-known construction and will not be described in detail herein except as to those elements thereof having to do with the furthering of my invention or which bear on the complete understanding of my invention to achieve my afore-stated objects.

My invention relates to an apparatus known as an articulator, for use by dentists and dental technicians for the purpose of mounting models of dentures of a patient and imitating the movement of the jaws of such patient so as to facilitate the cusps and ridges of the denture to coordinate with the patient's jaw movements.

This type of articulator is well known to those skilled in the art and is used to support for the manipulation thereof artificial teeth or dentures on the plates or bases in the same or equivalent relation to each other that they will occupy when placed in the mouth of the patient.

The articulator comprises a base 10 having a forwardly extending stem 11 and two oppositely extending lateral arms 12. Vertical posts 13 are rotatably carried adjacent the outer ends of the arms 12. Each post 13 is provided at its upper end with an adjustable condylar head 14.

The condylar heads 14 are hollow and each has formed in its peripheral edge a segmental slot 15.

Rotatably positioned in confronting relation to the inner circumferential surface of each head 14 is a ring 16. This ring 16 is provided with an arcuate slot 17 formed in its inner surface. Fixedly carried in the slot 17 is a circular disc 18. This disc 18 has formed therein a triangular cut-out portion or sector 19 extending from each end of the slot 17 and the edge of the disc 18 inwardly beyond the center point of the disc as viewed in Figs. 1, 2, 3, 5 and 7.

This disc 18 is rotatable with the ring 16 about the inner surface of the head 14. Fixedly carried by the ring 16 and extending outwardly therefrom and through the segmental slot 15, is a hollow threaded stud 20. A hollow clamping nut 21 is adapted to be threaded on the stud 20 and into binding relation to the outer peripheral edge on either side of the slot 15 on the head 14. This nut 21 will latch the ring 16 in a fixed predetermined position with respect to the head 14.

A hollow bearing cage 22 is pivotally connected as at 23 to the disc 18. This cage 22 provides a housing for a ball-like bearing 24 fixedly carried by a shaft 25. The side walls of the cage 22 have cut-out portions having open communication with the hollow interior of the cage 22. It is through these cut-out portions that the shaft 25 extends.

The top and bottom wall of the cage 22 is provided with elongated slots 26 through which the cut-out edges of the disc 18 may pass for engagement with the ball-like bearing 24, when the cage 22 is pivoted about its connection 23. The free end of the cage 22 is formed into a substantially flat head surface 27. This head 27 has an aperture 28 formed therein.

Threaded through the hollow stud 20 and the hollow clamping nut 21 is a set screw 29. This set screw 29 may be threaded so that one end will engage the head 27 of the cage 22 and penetrate into the aperture 28 to latch the cage 22 to the ring 16 in a predetermined position with respect to the disc 18. The set screw 29 is threaded into the stud 20 against the action of a coil spring 30 embracing the screw 29 below the head thereof.

Carried by the shaft 25 is a bushing 31, which carries an upper arm 32 which supports the incisal pin 33. This pin 33 has an indicating point which is adapted to engage into a recessed incisal guide 34 formed in the base 10 of the articulator.

The center of the disc 18 represents the condylar socket centers of the maxillae and the shaft 25 represents the maxillary condylar line.

In most cases of application, the angularity of the condylar heads 14 differs after adjusting them to the measurements of the patient. Most frequently the condylar socket centers of the maxillae of the patient have a slight upward, rearward and lateral movement. In such case, when the bearing cage 22 is free to pivot about its connection 23, the shaft 25 will be able to freely follow and react when the incisal pin 33 is moved over the incisal guide 34.

In the patient, the upper jaw member has axes of rotation which vary according to formation and measurements of the bone and tissue of the individual patient, and these axes of rotation are compensated by my construction of parts. Thus, the device as disclosed herein is capable of performing movements equivalent to all masticatory movements of the patient. The dental articulator as herein described permits the free movement of parts to so determine the masticatory movements of the human jaw and at the same time provides a simple and convenient means of releasably latching the movable parts together for pre-setting according to the measurements previously taken of the patient's jaw structure.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A dental articulator comprising a triangular base having an incisal guide at one end and vertical posts rotatably carried on opposite opposed ends of the triangular base, condylar heads carried at the upper ends of said posts, means carried by said heads and rotatable about a horizontal axis with respect thereto, bearing cages carried by said rotatable means, means on an incisal pin supporting member contained in said cages to provide slidable connections between said means and said rotatable means, an incisal pin supported by said member and movable therewith into operative position with respect to said guide, means operative on said heads for releasably latching said rotatable means in a predetermined position, and means cooperating with said latching means for releasably latching said bearing cages in a predetermined position with respect to said rotatable means for preventing movement in one direction of said incisal pin with respect to said guide.

2. A dental articulator comprising a triangular base having an incisal guide at one end and vertical posts rotatably carried on opposite opposed ends of the triangular base, condylar heads supported at the upper ends of said posts, circular disks rotatably carried by said heads and having a sector removed therefrom, bearing cages carried by said disks, means on an incisal pin supporting member contained in said cages to provide slidable connections between said means and said disks, an incisal pin supported by said member and movable therewith into operative position with respect to said guide, means operative on said heads for releasably latching said disks in a predetermined position, and means cooperating with said latching means for releasably latching said bearing cages in a predetermined position with respect to said disks for preventing movement in one direction of said incisal pin with respect to said guide.

3. A dental articulator comprising a triangular base having an incisal guide at one end and vertical posts rotatably carried on opposite opposed ends of the triangular base, condylar heads supported on the upper ends of said posts, means carried by said heads and rotatable about a horizontal axis with respect thereto, means carried by said rotatable means providing movable connection between an incisal pin supporting member and said heads, an incisal pin supported by said member and movable therewith into operative position with respect to said guide, said connection means and said rotatable means cooperating to provide said supporting member and said pin with a universal movement with respect to said guide, said condylar heads having formed through their peripheral edges a segmental slot, a threaded hollow stud carried by said rotatable means for projection out of said slot, a hollow thumb nut threadable upon said stud to bind said rotatable means in a predetermined position with respect to said heads, and a set screw threadable through said hollow nut and stud and into engagement with said connection means to latch said connection means in a predetermined position with respect to said rotatable means to prevent universal movement of said incisal pin.

4. A dental articulator comprising a triangular base having an incisal guide at one end and vertical posts rotatably carried on opposite opposed ends of the triangular base, condylar heads supported on the upper ends of said posts, circular disks carried by said heads and rotatable about a horizontal axis with respect thereto, bearing cages carried by said disks providing movable connection between an incisal pin supporting member and said heads, an incisal pin supported by said member and movable therewith into operative position with respect to said guide, said cages and said disks cooperating to provide said member and said pin with a universal movement with respect to said guide, said condylar heads having formed through their peripheral edges a segmental slot, a threaded hollow stud carried by said disks and projecting out of said slot, a hollow thumb nut threadable upon said stud to bind said disks in a predetermined position with respect to said heads, and a set screw threadable through said nut and said stud and into engagement with said cages to latch said cages in a predetermined position with respect to said disks to prevent universal movement of said incisal pin.

5. A dental articulator comprising a triangular base having an incisal guide at its front end and vertical posts rotatably carried on opposite opposed ends of the triangular base, hollow condylar heads supported on the upper ends of said posts, circular disks rotatably carried by said heads and having a sector removed therefrom, hollow bearing cages carried by said disks, means on an incisal pin supporting member contained in said cages to provide slidable connections between said means and said disks, an incisal pin supported by said member and movable therewith into operative position with respect to said incisal guide, said last means slidable in said cages and said cages pivotable through the removed sector of said disks so as to provide a universal movement for said pin with respect to said guide, said condylar heads having formed through their peripheral edges a segmental slot, a threaded hollow stud carried by said disks and projecting out of said slot, a hollow thumb nut threadable upon said stud to bind said disks in a predetermined position with respect to said heads, and a set screw threadable through said hollow nut and stud and into engagement with said cages to latch said cages in a predetermined position with respect to said disks to prevent universal movement of said incisal pin with respect to said guide.

References Cited in the file of this patent
UNITED STATES PATENTS 2,763,061     Bergstrom _____ Sept. 18, 1956